(12) United States Patent
Lai et al.

(10) Patent No.: US 9,781,427 B2
(45) Date of Patent: Oct. 3, 2017

(54) METHODS AND SYSTEMS FOR ESTIMATING ENTROPY

(71) Applicant: CHUNG YUAN CHRISTIAN UNIVERSITY, Tao-Yuan (TW)

(72) Inventors: Yu-Kuen Lai, Tao-Yuan (TW); Theophilus Wellem, Tao-Yuan (TW); Hui-Ping Yu, Tao-Yuan (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 321 days.

(21) Appl. No.: 14/640,351

(22) Filed: Mar. 6, 2015

(65) Prior Publication Data

US 2016/0191918 A1    Jun. 30, 2016

(30) Foreign Application Priority Data

Dec. 31, 2014   (TW) .............................. 103146640 A

(51) Int. Cl.

| H04N 19/13 | (2014.01) |
|---|---|
| H04N 19/91 | (2014.01) |
| H04N 19/19 | (2014.01) |
| H04N 19/132 | (2014.01) |
| H04N 19/149 | (2014.01) |
| H04N 19/166 | (2014.01) |
| H04N 19/164 | (2014.01) |

(52) U.S. Cl.
CPC .......... *H04N 19/13* (2014.11); *H04N 19/132* (2014.11); *H04N 19/149* (2014.11); *H04N 19/164* (2014.11); *H04N 19/166* (2014.11); *H04N 19/19* (2014.11); *H04N 19/91* (2014.11)

(58) Field of Classification Search
CPC .. G06F 17/18; G06F 17/30539; G06F 9/5055; H04L 41/142; H04L 63/1416; H04N 19/13; H04N 19/19; H04N 19/91; H04N 19/132; H04N 19/149; H04N 19/164; H04N 19/166

See application file for complete search history.

(56) References Cited

U.S. PATENT DOCUMENTS

| 2007/0198548 A1* | 8/2007 | Lee ................... G06F 17/30539 |
|---|---|---|
| 2009/0031175 A1* | 1/2009 | Aggarwal ............... G06F 17/18 |
| | | 714/47.2 |
| 2009/0285117 A1* | 11/2009 | Wang .................... H04L 41/142 |
| | | 370/253 |
| 2014/0165068 A1* | 6/2014 | Hurley .................. G06F 9/5055 |
| | | 718/102 |
| 2015/0052601 A1* | 2/2015 | White ................. H04L 63/1416 |
| | | 726/13 |

OTHER PUBLICATIONS

Lall et al., "Data Streaming Algorithms for Estimating Entropy of Network Traffic," Jun. 30, 2006, ACM, pp. 145-156.*
Charikar et al., "Finding frequent items in data streams," 2004, Theoretical Computer Science, pp. 3-15.*
Machta, "Entropy, information, and computation," 1999, American Association of Physics Teachers, pp. 1074-1077.*

* cited by examiner

*Primary Examiner* — Le H Luu
(74) *Attorney, Agent, or Firm* — WPAT, PC

(57) ABSTRACT

It is a challenge task to conduct Entropy computation on the attributes of packet header in high-speed networks. Motivated by Ashwin Lall et al., we present a stream-based scheme to estimate to the entropy norm based on Count Sketch algorithm. The system is implemented on a NetFPGA-10G platform. It is capable of processing IP packets and computing the entropy in 30 Gbps line rate.

13 Claims, 6 Drawing Sheets

METHODS AND SYSTEMS FOR ESTIMATING ENTROPY

BACKGROUND OF THE INVENTION

1. Field of the Invention

This invention generally relates to a method and system for estimating entropy, and more particularly, to a method and system for entropy which is adopted to flow analyze of high-speed network.

2. Description of the Prior Art

In recent year, the network has developed very fast and the transmission rate is growing up every day, and therefore, the cyber attack and the unusual behavior are becoming more prevalent, for example, worm, port scan, distributed denial of service (DDoS), address scan, etc. These cyber attacks and the unusual behaviors may affect the normal network environment and the user. At network observation, we may analyze and count the packet header information to observe whether the abnormal state in the network happens.

Entropy, which measures the degree of concentration and dispersion of a given feature space, is utilized as important indicator of changes of network traffic behavior. The higher entropy value indicates the degree of dispersion, and the lower entropy value indicates the degree of concentration. The entropy value is analyzed according to the packet header information so as to understand the change of the network flow distribution and search out whether the cyber attack or the unusual behavior exists. Take, for example, DDoS, many IP addresses from various source are transmitted to the same destination IP address meanwhile the kind of source IP addresses are increased and the attacked packets of destination IP address are increased. Thereby, distribution of network flow will be changed. These special distributions will change the entropy value, and if the distributions focus on some specific flow ID to low the entropy value, but if the flow ID are averagely dispersed so as to increase the entropy value. Thereby, the analyze of entropy value is widely applied in the associated application analyze of the network security for searching out the distribution feature of network flow so as to conclude whether the cyber attack or the unusual behavior occurs.

In high-speed network, a mass of data is needed to analyze and count in short time. If the mass of data are processed by the software, it needs to spend a long operation time and a hung storage space. Moreover, in the information theory, the entropy value is used to measure the concentration degree of data and count all the packet header information right time, and it must spend much time and storage source to calculate the entropy value. The tradition entropy equation is represented as follow (1), wherein m is the total number of packets, $m_i$ is the packet number of flow ID $i \in [n]$, n is the kind of packets.

$$H = -\sum_{i=1}^{n} \frac{m_i}{m} \log \frac{m_i}{m} \quad (1)$$

For calculating the entropy value in the high speed network environment, Ashwin Lall offer data streaming algorithms for estimating entropy of network traffic to improve the equation of entropy value as follows (2). Then, the S value is deduced according to the equation (2), and the deduced equation of S value is represented as follows (3). Ashwin Lall believes that the entropy value H is calculated according to the estimation of S value. So the S value is estimated by the data streaming algorithms for estimating entropy, and then the S value is imported into the equation (4) to obtain the last estimation entropy value.

$$H = \log(m) - \frac{1}{m} \sum_{i=1}^{n} m_i \log(m_i) \quad (2)$$

$$S = \sum_{i}^{n} m_i \log(m_i) \quad (3)$$

$$H = \log(m) - \frac{S}{m} \quad (4)$$

The data streaming algorithms for estimating entropy being a spin-off of the algorithm according to AMS algorithm is represented at Table 1. The data streaming algorithms is mainly divided to three phases, at the first phase, g×z locations are randomly sampled in the stream data, the packet number m must be known and set the allowable error before sampling, so as to determine the number of sample, and regarding to the select equation of g and z, please refer equation (5). The second phase is divided to two portions: update and sample. The flow IDs of all packets are compared in the stream data in update portion. The counter c if someone flow ID was sampled.

$$z = \left\lceil \frac{32 \log_2 m}{\varepsilon^2} \right\rceil, g = 2 \log_2 \frac{1}{\delta} \quad (5)$$

$$X = m(c \log(c) - (c-1)\log(c-1)) \quad (6)$$

TABLE 1

Pre-processing stage
$z = \left\lceil \frac{32 \log_2 m}{\varepsilon^2} \right\rceil, g = 2 \log_2 \frac{1}{\delta}$
    choose g × z location in the stream at random
Online stage
    for each item $a_j$ in the stream do
        if $a_j$ already has one or more counter
        then
            Increment all of $a_j$'s counters
        If j is one of the randomly chosen locations
        then
            start keeping a counter for $a_j$
            initialized at 1
Post-processing stage
//View the g * z counters as a matrix c of size g × z
    for i:= 1 to g do
        for j:= 1 to z do
            $X_{i,j} = m(c_{i,j} \log(c_{i,j}) - (c_{i,j} - 1)\log(c_{i,j} - 1))$
    for i:= 1 to g do
        avg[i]:= the average of the X in group i
    return the median of avg[1],...,avg[g]

The algorithm of Table 2 is simply concluded according to the algorithm of Table 1:

TABLE 2 a data streaming $\phi = (a_1, a_2, \ldots a_m)$ has m items, where the $t_{th}$ item $a_t$ (k) consists of a key $k \in [n]$.
1: Choose a number y uniformly at random from $\{1, 2, \ldots m\}$;
2: Maintain a counter $C = |\{r : a_r(k) = a_y(k), y \le r \le m\}|$;
3: Output $S = m(C \log C - (C-1) \log(C-1))$.

In the environment of high-speed network, the software manner must spend much operation time caused that it can not detect the unusual immediately, so S. Nagalakshmi uses FPGA hardware to implant the data streaming algorithm for estimating entropy disclosed by Ashwin Lall. The S. Nagalakshmi suggests decreasing the number of counters, and proves the error rate of calculation result still to be maintained in the predefine error range. Although S. Nagalakshmi uses 112 set calculation modules to process the packet number in parallel, it still needs to spend much time to perform the comparison and update of memory access. Once it has mass packet and locates in the high-speed network environment, the manner disclosed by S. Nagalakshmi is still satisfied to the requirement of wire speed so as to increase the error rate of estimating entropy.

For the reason that the conventional system and method for estimating entropy could not process the mass packets in the high-speed network environment, a need has arisen to propose a novel scheme that may adaptively process the mass packets in the high-speed network environment so as to decrease the hardware source operated and operation time.

SUMMARY OF THE INVENTION

In view of the foregoing, it is an object of the present invention to provide a method for estimating entropy. The method for estimating entropy comprises: setting an allowable error to deciding a sample number according to a total of packets in a stream data; randomly sampling a plurality of locations in the stream data; applying to a count sketch algorithm to each packet for performing the count and update; applying the counter sketch algorithm to the each packet for performing the query according to flow IDs of the plurality of locations; recording each query result of the each packet onto an entropy table; obtaining an average of a counter used in each same row in the entropy table; selecting a median to be an estimation value from the averages; and obtaining an estimation entropy value according to the estimation value.

Based on one object of the present invention, a system for estimating entropy is disclosed according to one embodiment of the present invention. The system for estimating entropy value comprises: a measuring module, setting an allowable error to deciding a sample number according to a total of packets in a stream data; a sampling module, coupled to the measuring module, randomly sampling a plurality of locations in the stream data; a calculation and update module, coupled to the sampling module, applying to a count sketch algorithm to each packet for performing the count and update; a query module, coupled to the calculation and update module, applying the counter sketch algorithm to the each packet for performing the query according to flow IDs of the plurality of locations; and a storage module, coupled to the query module and the calculation and update module, obtaining an average of a counter used in each same row in the entropy table, and selecting a median to be an estimation value from the averages, and obtaining an estimation entropy value according to the estimation value.

Based on one object of the present invention, a method for estimating entropy is disclosed according to one embodiment of the present invention. The method for estimating entropy value comprises: applying a data streaming algorithm for estimating entropy for deciding a sampling number and randomly sampling a plurality of locations in a stream data; and applying a count sketch algorithm to obtain a estimation entropy value.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Some embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 1:
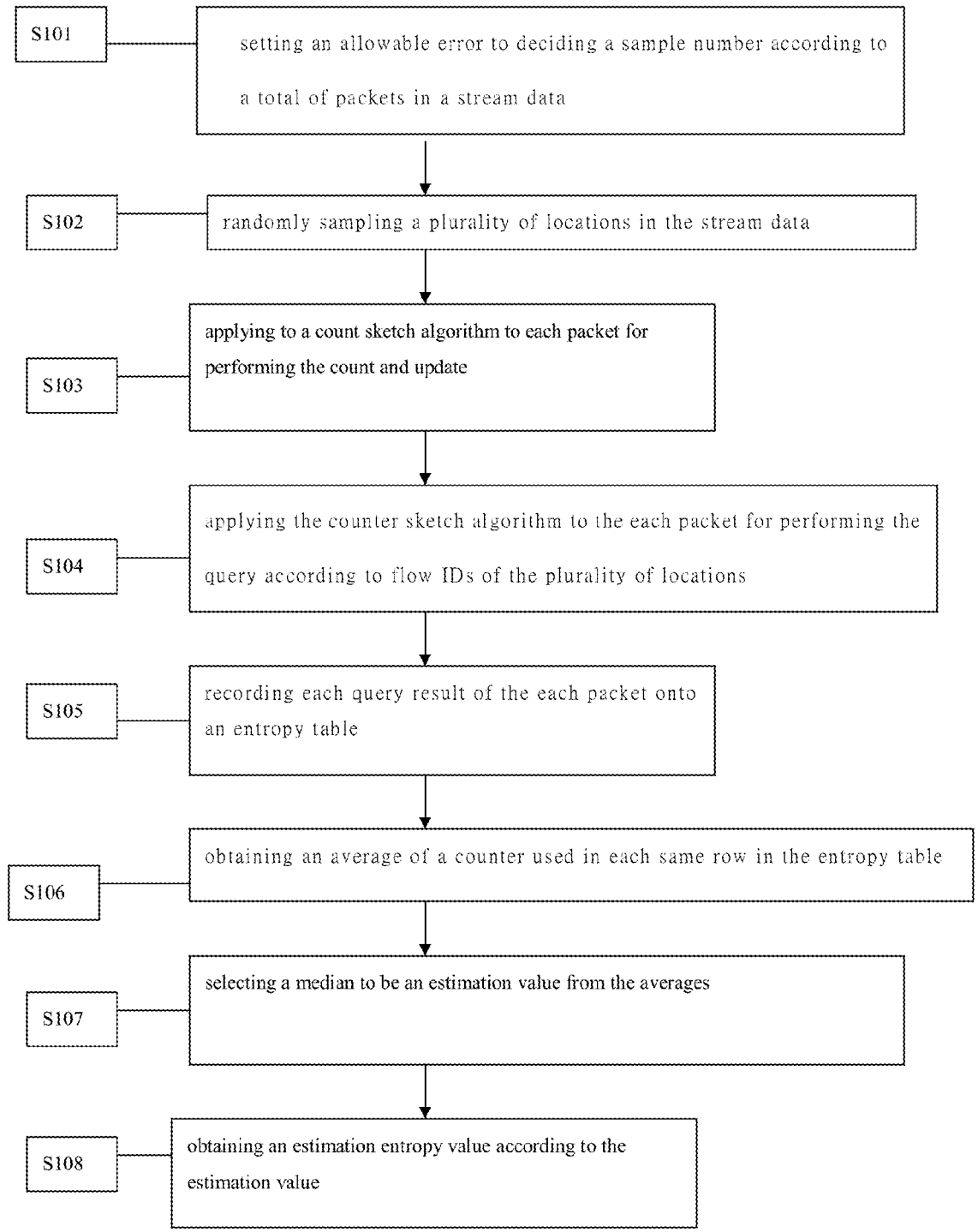
FIG. 1 shows a flow chart diagram of a method for estimating entropy according to one embodiment of the present invention.

Referring to FIG. 1, which illustrates a method for estimating entropy value, the method comprises: setting an allowable error to deciding a sample number according to a total of packets in a stream data (step S101). Moreover, randomly sampling a plurality of locations in the stream data (step S102), wherein the plurality of locations is an array having g×z locations according to an equation as follows:

$$z = \left\lceil \frac{32\log_2 m}{\varepsilon^2} \right\rceil, g = 2\log_2 \frac{1}{\delta}.$$

Additionally, applying to a count sketch algorithm to each packet for performing the count and update (the step S103), and applying the counter sketch algorithm to the each packet for performing the query according to flow IDs of the plurality of locations (the step S104), and recording each query result of the each packet onto an entropy table (the step S105), wherein the entropy table is an array table.

Next, obtaining an average of a counter used in each same row in the entropy table (the step S106), and selecting a median to be an estimation value from the averages (the step S107), and obtaining an estimation entropy value according to the estimation value (the step S108). Specifically, the step of obtaining an average of a counter used in each same row in the entropy table further comprises: obtaining a calculation value by calculating the counter value used in the each same row in the entropy table according to a equation, and obtaining the average of the counter of each row according to the calculation value, wherein the equation is represents as follows:

$$X=m(c\ \log(c)-(c-1)\log(c-1)).$$

Specifically, the step of obtaining an estimation entropy value according to the estimation value further comprises: substituting the estimation value into a equation to obtain a estimation entropy value, and wherein the equation being represented as follow, $$H = \log(m) - \frac{S}{m}.$$

Figure 2:
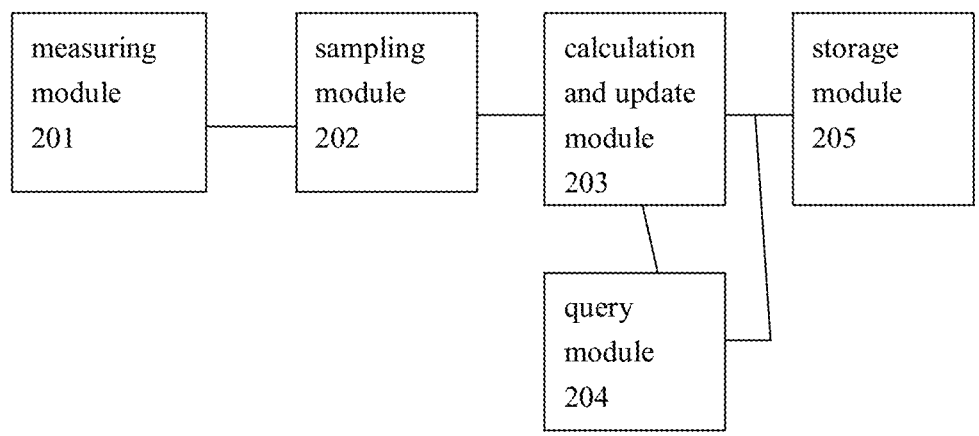
FIG. 2 shows a block diagram of a system for estimating entropy according to one embodiment of the present invention.

Referring to FIG. 2, which illustrates a system for estimating entropy, the system comprises: a measuring module 201, a sampling module 202, a calculation and update module 203, a query module 204 and a storage module 205.

The measuring module 201 is used for setting an allowable error to deciding a sample number according to a total of packets in a stream data. The sampling module 202 being coupled to the measuring module 201 is used for applying to a count sketch algorithm to each packet for performing the count and update, wherein the plurality of locations is an array having g×z locations according to an equation as follows:

$$z = \left\lceil \frac{32 \log_2 m}{\varepsilon^2} \right\rceil, g = 2\log_2 \frac{1}{\delta}.$$

The calculation and update module 203 being coupled to the sampling module 202 is used for applying to a count sketch algorithm to each packet for performing the count and update. The calculation and update module 203 obtains a calculation value by calculating the counter value used in the each same row in the entropy table according to a equation, and obtains the average of the counter of each row according to the calculation value, and the equation is represents as follows:

X=m(c log(c)−(c−1)log(c−1)).

The calculation and update module substitutes the estimation value into a equation to obtain a estimation entropy value, and wherein the equation being represented as follow, $$H = \log(m) - \frac{S}{m}.$$

The query module 204 being coupled to the calculation and update module 203 is used for applying the counter sketch algorithm to the each packet for performing the query according to flow IDs of the plurality of locations. The storage module 205 being coupled to the query module 204 and the calculation and update module 203 is used for obtaining an average of a counter used in each same row in the entropy table, and selecting a median to be an estimation value from the averages, and obtaining an estimation entropy value according to the estimation value.

The Count Sketch only utilizes the less memory to perform the fast summary process for a mass data, maps the data to the fixed storage location via the hash function, and query, update the statistical data of each flow ID. The Count Sketch has the feature of linear aggregation, and therefore, the Count Sketch can combine different the observation points or the observation ranges by using the same parameter.

The Count Sketch being an estimation algorithm of (ε, δ) is used to estimate the occurrence frequency of each item in the stream data. The count sketch algorithm uses t sets array counters, and each set array comprises b counters and each counter is 32 bits counter, the parameters t and b are selected by equation (7).

$$b = \frac{1}{\varepsilon^2}, t = O\left(\log\frac{1}{\delta}\right) \quad (7)$$

In Count Sketch algorithm, every set counter array has two universal hash function, $h_i(x)$ and $s_i(x)$, and the mapping ranges of $h_i(x)$ and $s_i(x)$ respectively is $\{0, 1, 2, \ldots, b-1\}$ and $\{+1, -1\}$. The algorithm operation flow is divided to Update and Query.

Figure 3:
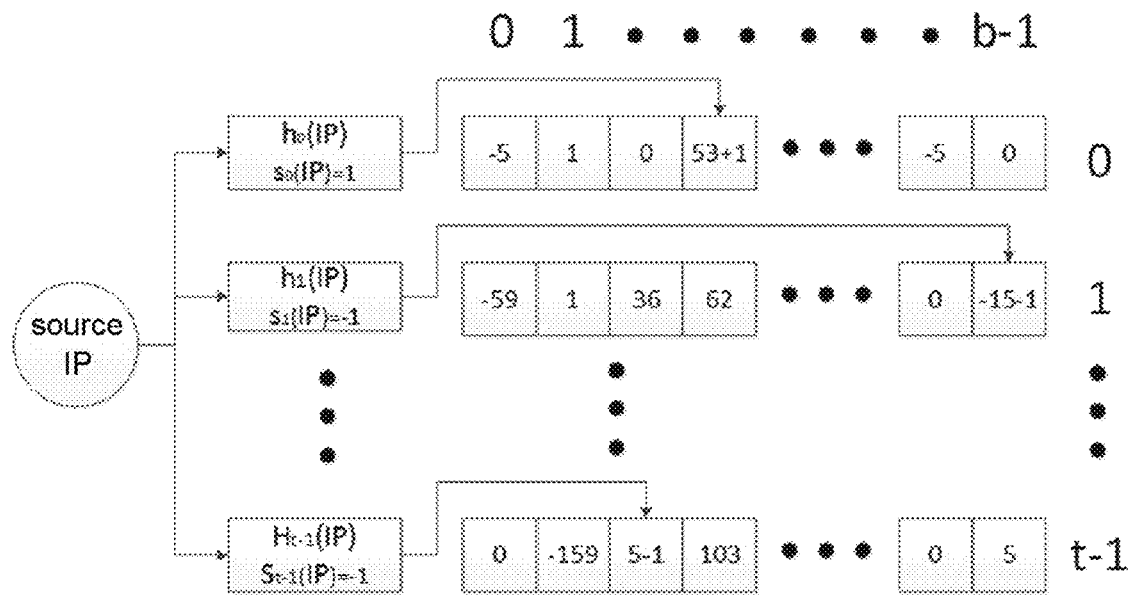
FIG. 3 shows an operation diagram of packet updated by the count sketch algorithm.

Referring to FIG. 3, which illustrates an operation diagram of packet updated by the count sketch algorithm. At packet update portion, the algorithm performs t hash function operation for IP address, $h_i(IP)$, and then, the associated array locations are respectively updated, $s_i(IP)$, $$C[i,h_i(IP)]=C[i,h_i(IP)]+s_i(IP), i=1,\ldots,t \quad (8)$$

When the count is over, the calculation value $h_i(x)$ generated from the hash function $h_i(\ )$ and flow ID x is to be as the address, the statistical value read from the t one-dimensional array is multiplied by the hash function $s_i(x)$, the calculation equation is showed in (9). A median is captured from the values queried by the t array, and the median is the packet estimation number of flow ID code x.

$$f_i = C[i,h_i(x)] \times s_i(x), i=1,\ldots,t \quad (9)$$

The present invention improves the data streaming algorithms for estimating entropy of network traffic disclosed by Ashwin Lall et al., and the accuracy packet count number of Ashwin Lall is replaced with packet occurrence time of estimating by the Count Sketch algorithm, as shown in Table 3. When starting to perform the measure, the system updates every packet count number, and then, performs the packet query of Count Sketch according to flow IDs of g×z locations selected. Next, the query result is recorded onto the entropy array Est[ ]. When the observation operation is ended, all of the counter value at same raw is used to calculate X value according to the equation (6). It obtains the average avg[i] of every raw after calculating, and then, selects a median to be as estimation value of S from every raw value. The estimation value H is calculated by equation (4). Therefore, in the allowable error, the system and method for estimating entropy of the present invention is better than A. Lall because the present invention can decrease the usage of memory and operation time of algorithm. For example, the algorithm disclosed by A. Lall, the flow ID is operated by the hash function to search out the associated locations when someone packet is sampled, and then, the counter number is added for the sample packet, and the flow ID of packet is stored into the estimating entropy table and the counter is set as 1. If the same locations are sampled, it must perform the serial connection update. The memory access time is 2+i according to different the collision time i. However, the present invention combines the Count Sketch algorithm with the data streaming algorithm to perform the packet count query of flow ID, and then the query value is recorded onto the estimating entropy table in sequence, the memory access time is 2.

TABLE 3

Online stage
    stream S = {$a_o, a_1, \ldots, a_i, \ldots, a_m$}
    begin
        Est[0,0]....Est[g-1,z-1]=0;
        C[0,0]....C[t-1, b-1]=0;
        p = 0;
        q = 0;
        for each element $a_i$ from S
          for j from 1 to t
            C[j, $h_j(a_i)$]=C[j, $h_j(a_i)$]+ $g_i(a_i)$
          end for chose $a_i$ with probability of $\frac{m}{g \times z}$ for j from 0 to t-1
          / /find median from C[j, $h_j(a_i)$]
          Est[p, q] = median(C[j, $h_j(a_i)$])
          p = p + 1
            if (p == g-1)
              p = 0
              q = q + 1
            end if
          end for j
        end for
    end
Post-processing stage
for i from 0 to g-1
    from j from 0 to z-1
        X[i, j] = m × (Est[i, j] × log Est[i, j] − (Est[i, j] − 1) × log(Est[i, j] − 1))
    end for
        avg[i] = Average of X[i,j] in group i
end for
find median from avg[0],...avg[g-1]
H = log m − (median (avg[i])/m)

The algorithm of Table 4 is simply concluded according to the algorithm of Table 3.

TABLE 4

Initialize:

1 Set $CS_{ij} = 0$, where $1 \leq i \leq e_i$, $1 \leq j \leq t$, $e := \frac{3}{\varepsilon^2}$ and $t := O\left(\log\left(\frac{1}{\delta}\right)\right)$;

2 Choose t independent hash function $h_i : [n] \to [e]$ from a 2-universal family;
3 Choose t independent hash function $g_i : [n] \to \{+1, -1\}$ from a 2-universal family;
Update: (item a = (k,u) consists of a key k and update u)
1 for j = 1 to t do
    $CS_{h_j(k),j} = CS_{h_j(k),j} + u \cdot g_j(k)$;
Query:
1 On a query of an item a (consists of a key k), report
    $f_a = \text{median} 1 \leq j \leq t, g_j(k) \cdot CS_{h_j(k),j}$ At update portion, the data streaming algorithm for estimating entropy value disclosed by A. Lall performs the hash function operation to the flow IDs to search the associated locations and performs the comparison of the flow IDs. The algorithm performs the comparison of 1+i times and i times for the read of serial connection index according to different collision times i. if the number of same flow IDs is j, the memory access must be performs 2×j times, and the memory access of the total (i+2)+i+(2×j) times is performed. However, the present invention uses the Count Sketch algorithm combined with the data streaming algorithm for estimating entropy to perform the memory access, it only needs the memory access (read/write) of 2 times. The memory access times as shown in Table 5.

TABLE 5

| | Data streaming algorithm | Algorithm based on Count Sketch |
|---|---|---|
| Update | (i + 2) + i + (2 × j) | 2 |
| Sample | 2 + i | 2 |

Moreover, the preset invention uses the same memory size (400 k bytes) and the less count sketch array (112 k bytes) to compare the estimation error of entropy. The comparison result is represented to Table 6. The present invention uses the Count Sketch algorithm to replace with the accuracy count of data streaming algorithm disclosed by the A. Lall, and thereby, at Table 6, to take the Count Sketch array 4 k for example, the present invention only uses near a quarter of memory size to limit the error rate in 5% so as to decrease the operation time of system.

TABLE 6

| | Data streaming algorithm | Count Sketch | Count Sketch(4k) |
|---|---|---|---|
| estimationm entropy space use | 4k × 4 × 200 = 3200 | 4k × 4 × 32 = 512 | 4k × 4 × 32 = 512 |
| Count sketch space use | N/A | 28k × 3 × 32 = 2688 | 4k × 3 × 32 = 384 |
| Total space use | 400 | 400 | 112 |
| Error rate | 0.01% | 1.35% | 4.23% |

Additionally, the present invention applies the NetFPGA-10G platform to implant two modules, one is the measure of the data streaming algorithm for estimating entropy adapted to the high-speed network, another one is the module of estimating entropy. The NetFPGA platform being Field-programmable gate array is developed by the Stanford University of US. The designer may use Verilog language (VHDL) to develop the network system, for example, the switch, router and the like.

The present invention uses the network card of NetFPGA-10G to be as reference NIC, and adds the Histogram Module based on packet update of Count Sketch algorithm into the reference NIC, so as to implant the Hash function, counter array and reservoir sampling. This purpose of adding the NetFPGA-10G is to accelerate the counter update speed of the statistical table and estimating entropy table. The measure level mainly has two parts: the packet update and packet sample.

At packet update part, the Count Sketch algorithm is used to perform the packet number count, the count packet parameter is set to three sets, every set has 28 k number counter array with 32 bits (t=3, b=28 k), and for hardware part, three BRAMs are used to packet update in right time. When the packet is entered to the measure module, the access location operation of Count Sketch is performed by using 2-Universal hash function. When the hash function is operated, it also performs the mod operation. Thereby, it needs a mass source and time to implant the hardware system. As a result, the present invention uses CW-trick or Mersenne number to perform the operations of three hash function in parallel.

Figure 4:
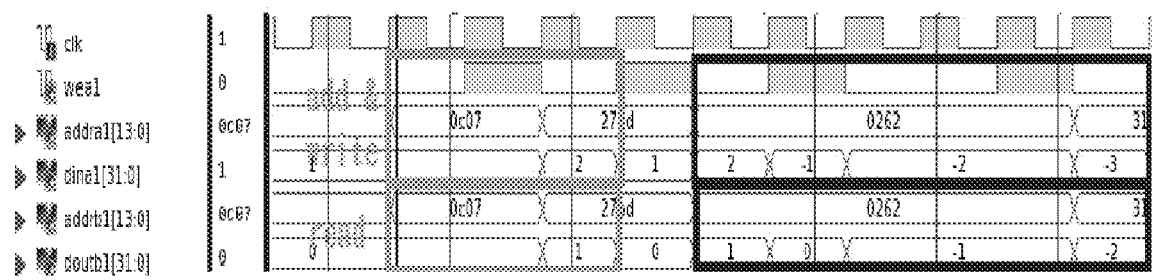
FIG. 4 shows a simulation waveform diagram of counting the packet update.

Referring to FIG. 4, which illustrates the simulation waveform diagram of counting the packet update. In the present embodiment, it utilities the Xilinx development tool iSim to perform the verification of hardware simulation, and generate the file according to the packet provided by the NetFPGA-10G to generate the requirement header information to perform the simulation verification of system so as to generate the packets from different source addresses and respectively transmit the packet to verify whether the Count Sketch can read or write correctly. As shown in FIG. 4, the block line represents the read/write simulation of single packet memory access transmitted from someone IP, and the associated memory location 0x0c07 may read out the original value being 0. The memory read value is changed to 1 when writing into the memory. The portion in block line represents that someone IP continuously transmits tow packets, and the associated memory location is 0x0262, and the read value is 0. The read value is changed to −1 when writing into the memory. Then, the read value is changed from −1 to −2 when writing the second packet. Therefore, the system is verified to correct because the memory can correctly count the packet number after continuously transmitting same packets.

Reservoir sampling algorithm may solve the data sample question of unknown length, as shown in Table 7. When data streaming number (n) is smaller than sample number (m), every data $e_n$ is sampled; when the data streaming number (n) is larger than sample number (n), it determines whether $e_n$ is selected according to the probability of $$\frac{m}{n},$$

if the $e_n$ is selected, the original sample $e_n$ is replaced with the new one which is randomly selected from the sample data (R).

TABLE 7

```
begin
    for each eₙ ∈ {e₁,e₂,.....} from S
        if n ≤ m
            insert eₙ into R
        else
            insert eₙ into R with probability of m/n
            and at the same time evict an element form R
            with uniform probability
        end if
    end for
end
```

The present invention performs the sample by using the method of reservoir sample algorithm. When the packet is sampled, the count packet number of three set count sketch can be queried according to flow IDs of the packet sampled, and the median is selected to be as the estimation number of the flow ID, and the packet number estimated is into the array of estimating entropy algorithm. The reservoir sampling algorithm is implanted by the hardware manner, the random algorithm uses 2-Universal hash function to determine whether the packet is selected so as to improve the reservoir sample algorithm to decrease the hardware source and operation time. The algorithm disclosed by the original inventor set the packet random sample probability of $$\frac{m}{n},$$

wherein m is the sample number, n is data steaming number. When the algorithm is implanted by the hardware manner, the original sample probability is changed to $$\frac{1}{p},$$

wherein $$p = \left\lceil \frac{n}{m} \right\rceil = 2^k, k \in N.$$

In other words, when $$\left\lceil \frac{n}{m} \right\rceil$$

is a multiple of 2, and then replaces with p. Therefore, it uses the movement to replace with the multiplier to reduce the operation time of hardware system so as to solve the question is that it must perform mod operation when the hash function is operated.

Figure 5:
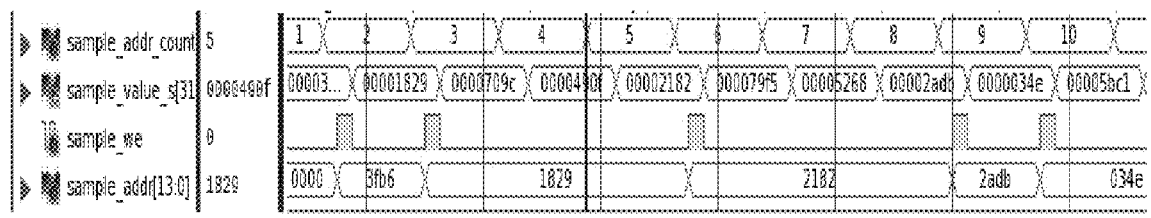
FIG. 5 shows a simulation waveform diagram of reservoir packet sample.

Referring to FIG. 5, which illustrates the simulation waveform diagram of reservoir packet sample. In the embodiment, the packet number (n) is substituted into 2-Universal hash function to generate a value. In the present embodiment, the value is set as the packet sample. When the value generated is smaller than the space size g×z of estimating entropy array, it performs the count sketch query of the packet, and the value is set as the replace address to achieve the purpose of implanting the reservoir sample by using hardware.

Figure 6:
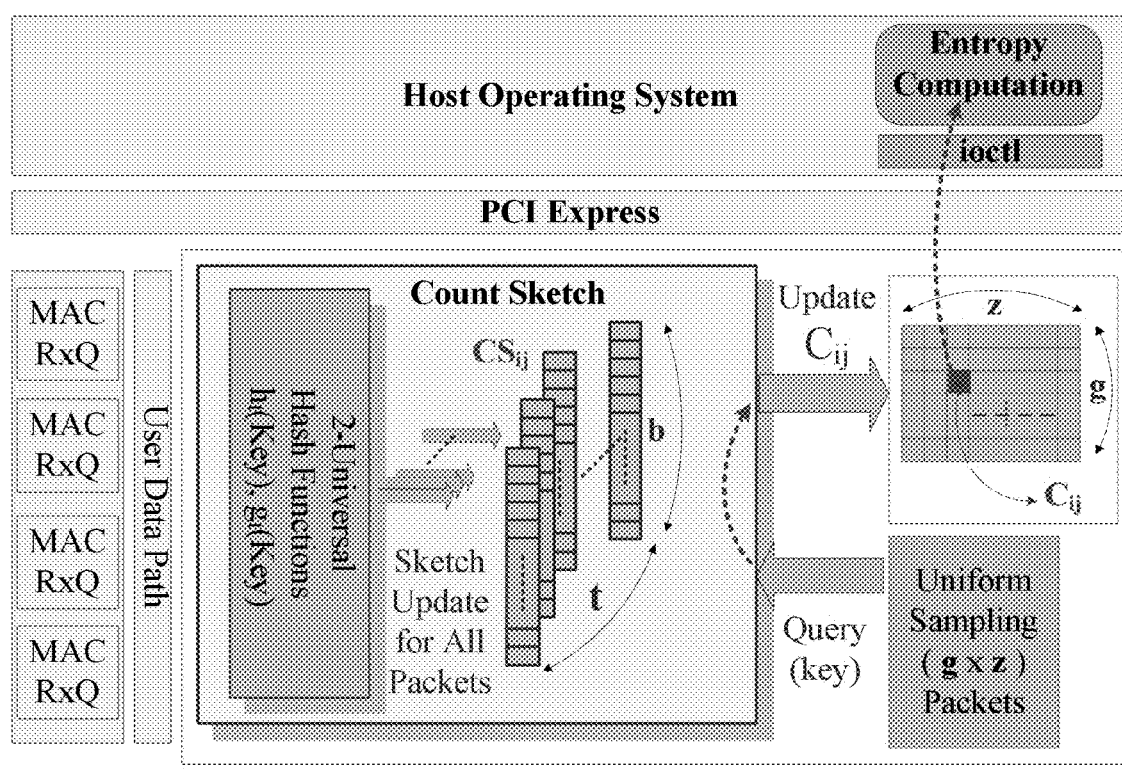
FIG. 6 shows a system operation structure diagram of estimating entropy.
Figure 7:
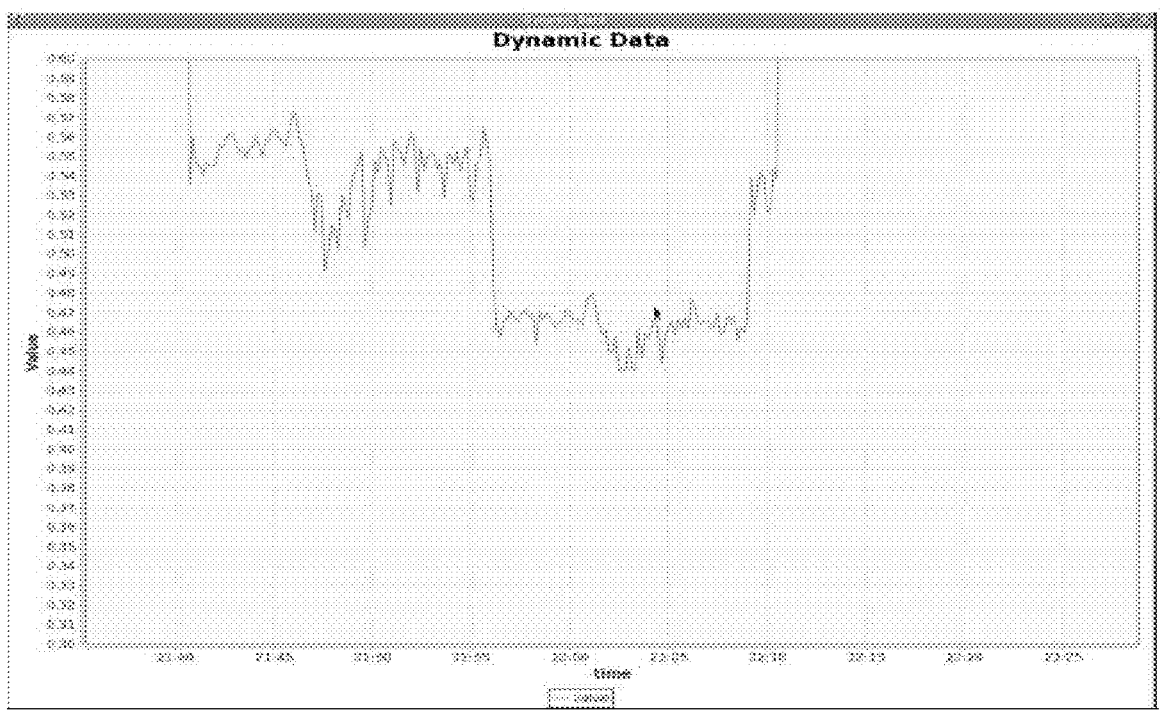
FIG. 7 shows a test result various diagram of combining the Count Sketch algorithm with the data streaming algorithm.

When the observation range is ended, the estimation entropy module is implanted by software emulation read out the estimation entropy table implanted by hardware emulation through PCI bus by using the moving window register, so as to perform the operation of entropy value, and the system operation structure is shown in FIG. 6. Referring to FIG. 6, which illustrates a system operation structure diagram of estimating entropy. The system is divided to hardware part and software part. The software part comprises the host operation system having ioctl function which is used to perform the operation of entropy value. The hardware part comprises the count sketch function having the 2-Universal hash function, and the IC chip that can perform the update and query. The software and hardware parts perform the transmission via the PCI Express bus. The system have the graphic user interface (GUI) which shows the various of entropy value, as shown in FIG. 7. The present invention discuss whether the system function is correct, the mean is whether the entropy value is changed when occurring the usual state. It uses the combine manner to copy the flow test file 2 to 30 minutes, and add the file with Slammer case after 15 minutes, every 10 second is a observation interval range. The feature of Slammer case is to search the host with hole via the hole of UDP port 1434 in the network. The present invention captures the section with great change in the flow record file to perform the test which has 15 minutes of total length. The entropy value test result is shown in FIG. 7. Referring to FIG. 7, which illustrates the test result various diagram of combining the Count Sketch algorithm with the data streaming algorithm.

FIG. 6 shows the proposed entropy computation system comprising two major parts. The hardware part, consisting of the Count Sketch data structure $CS_{ij}$, the counter array $C_{ij}$ and sampling modules, is responsible for tracking packet counts at line rate. For each arriving packet, sketch updates must be performed at wire-speed. When an incoming packet has been selected. Count Sketch is immediately queried. The result of the query is a ($\epsilon$, $\delta$)-approximation of the current packet count. The estimated packet count $f_a$ is placed in the counter array $C_{ij}$ for the estimator S. We argue that the point query from Count Sketch can mimic the behavior that is described in Algorithm 1 because the arrival sequence of packets in the data stream in a previous observation period does not influence the entropy norm computation. With respect to the software part, the host CPU computes the final entropy value based on the counter array $C_{ij}$ that is sent from the PCI Express bus after every observation period.

Additionally, because the space size is different, it will cause that the difference of the entropy measure result when using the Count Sketch algorithm to estimate the entropy value. Therefore, in the present embodiment, it will discuss that the accuracy of estimating entropy is affected by array size of different Count Sketch algorithm, and performs the psychical system test according the flow of the usual network behavior, so as to determine whether the network is abnormal and verify the system function.

For testing the accuracy of the algorithm and the actual efficacy of system, the embodiment respectively selects the different flow files to perform the test, the flow files are respectively introduced as follows:

The flow test file 1: the packet information is captured from the equinix-sanjose high-speed internet backbone. The flow test file 1 only remains the packet header information, and contains 30,801,712 IP packets, 448,809 IP source addresses, and the flow file length is 1 minutes.

The flow test file 2: the flow test file 2 is provided by the MAW. The flow test file 2 only remains the packet header information, and contains 3514656 IP packets, 51779 IP source addresses, and the total length of the flow test file 2 is 15 minutes.

The flow test file 3: the flow test file 3 is provided by the MAWI. The flow test file 3 only remains the packet header information, and contains 50,544,023 IP packets, 6364302 IP source addresses, and the total length of the flow test file 3 is 15 minutes.

Open source network tester (OSNT) is an open source network test system for realizing on the NetFPGA-10G platform. OSNT not only performs the test of high speed flow, but also saves the cost of buying the flow generation equipments. The ONST has two functions of OSNT Traffic Generator and OSNT Traffic Monitor, and provides the user the graphic user interface (GUI). The ONST flow generator may load the PCAP flow file on the SRAM, and repeat broadcast many times according to the different requirements, and the flow file size is limited according to the SRAM size. The OSNT also provide two control functions of the delay module and the rate limiter. The OSNT flow observer may capture the packets, count the packet number and measure the speed, and analyze the kind of packets and filter the specific packets.

For verifying whether the OSNT generates the flow of line speed, the present invention respectively enables two computers with NetFPGA-10G for testing whether the flow achieves 40 G of line speed, wherein one has the OSNT flow generator, another has flow observer, and the two computer are connected each other. Because the OSNT only provide two ports, and each port only receives 10G of line speed at present, the present embodiment uses two ONST flow generator to test whether the system achieves 40 G of line speed.

In the present embodiment, we uses two experiments to test whether the system for estimating entropy achieves the line speed. The effect of the biggest factor in the system is the update portion of the count sketch, so it is important to verify whether accurately count the packet in the line speed. The first test is to use the flow file generated from the IXIA, and the flow file comprises a hundreds IP locations (192.168.0.*) from different source terminals, and repeat to transmit 10 million times from four terminals. The value of Count Sketch counter in the measure system is read out after transmitting, and the result represents forty millions packet numbers read out from 100 counters. The second test is to use the smallest packet from the same flow IDs to perform the test, and uses different terminals to receive the packet at the same time. Lastly, the result of Count Sketch counter in the measure system is read out, the result is shown in Table 8. From the Table 8, it represents the measure system implanted by the hardware can correctly perform the count in the wire speed of 30G.

TABLE 8

| Connection number | Broadcast number of packet | Receive number of packet | Packet loss rate |
|---|---|---|---|
| 4 Port | 40000000 | 40,000,000 | 0% |
| 4 Port | 4000000000 | 3,592,643,390 | 10.0710525% |
| 3 Port | 30000000 | 30,000,000 | 0% |
| 3 Port | 3000000000 | 2,999,999,999 | 0.00000003% |

Figure 8:
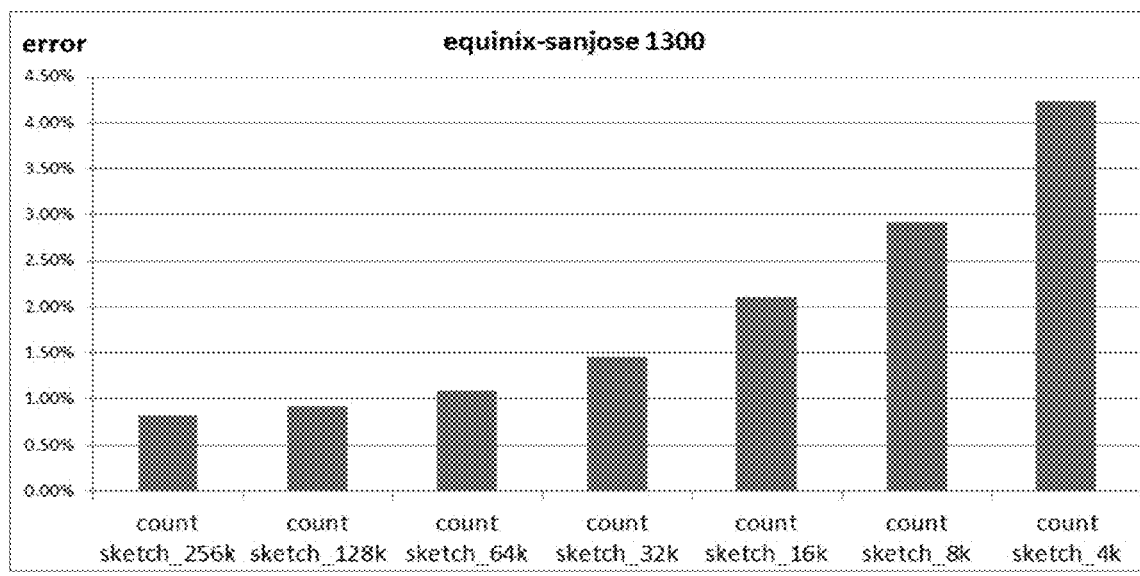
FIG. 8 shows a comparison statistical diagram of count sketch space size (4 k~256 k) and estimation entropy error.

Referring to FIG. 8, which illustrates a comparison statistical diagram of count sketch space size (4k~256 k) and estimation entropy error. In the present embodiment, the present invention uses the count sketch to perform the flow summary to estimate the packet number from different source terminal locations. However, the hash function used will occur the collision, caused that the packet estimation error of the source terminal so as to decrease the accuracy of estimating entropy value. Therefore, the present invention use the different array size to compare memory space with the error generated from the actual entropy value. The test is to use the software simulation to implant the combination Count Sketch algorithm with the data streaming algorithm, and uses the flow test file 1 to perform the accuracy analyze. The flow test file 1 records the packets from different sources and direction. It uses the source IP to be as the measure target, and the analyze result is shown in FIG. 8. When the Count Sketch algorithm is performed to the packet count, the smaller storage size has higher probability of collision each other, and the error rate of packet number is higher, caused that the increase of the error of estimating entropy.

The present invention uses the same flow files and same parameters to implant the hardware and software system when discussing the measure result of using the system implanted by the hardware and the software simulation, so as to verify whether the entropy value estimated by hardware and software are same. At hardware test, the present invention uses the host having the network card with the transmission rate of 10 G bit/s (Myricom 10G NIC) having two SPF+ fiber network ports, and uses TCPREPLAY to broadcast the test flow file to the system for estimating entropy so as to determine whether the test system can correctly calculate the entropy value, and compare the entropy value generated from the hardware with the entropy value generated from the software. The result is shown in Table 9. As shown in Table 9, it shows the test result from the hardware is same to the software, and therefore, the system function implanted by the hardware is correct.

TABLE 9

| Experiment flow file | Entropy from software | Entropy from hardware |
|---|---|---|
| Flow file 1 | 0.547319 | 0.547319 |
| Flow file 3 | 0.3038952 | 0.3038952 |

In the present embodiment, the proposed scheme is verified using synthetic data sets that are generated using a Zipfian distribution (no shown in). In the Zipfian distribution, the simulation is based on a Zipf parameter from 0.1 to 2.5. The synthetic data set comprises 1,000,000 packets with $k \in [2^{12}]$. A simulation based on the CAIDA antonymous Internet trace is also carried out. The trace, which is collected from CAIDA's equinix-sanjose high-speed Internet backbone, contains over 30 million packets and 448, 809 unique IPv4 source addresses. The total size of the memory that is used in the system for Count Sketch (384 k bytes) and the entropy norm estimator array $C_{ij}$ (40 k bytes) is 424 k bytes. The Count Sketch is composed of three counter arrays, each with 32 k entries. The estimator counter array $C_{ij}$ has 1×5120 counters. Each counter entry has 32-bits words. The proposed scheme can estimate the entropy value with limited error on synthetic data of various Zipf parameters. The Count Sketch approach has a higher estimated error than does the method of Lall et al. With a Zipf parameter of less than 1.25 mainly because the point query error of Count Sketch in a lightly skew distribution. The point query error of Count Sketch can be reduced by adding more entries to the counter. As present in FIG. 8, the relative estimated entropy error is below 1.5% with more than 32 k of entries in Count Sketch. The proposed method achieves a lower error because the scheme of Lall et al. must store packet counts of many identical keys in estimator counter array $C_{ij}$.

The present invention improves the data streaming algorithms for estimating entropy of network traffic disclosed by Ashwin Lall et al., we present a stream-based scheme to estimate to the entropy to the entropy norm based on count sketch algorithm. The system is confirmed using a NetFPGA-10G platform and applies the Verilog HDL language to implement the method for estimating entropy adapted to high speed core network. The present invention uses the actual network flow files to emulate and verify the accuracy of the estimating entropy algorithm, and use the OSNT to test the hardware system so as to make sure the result emulated by the emulator match the entropy value calculated by the measuring system according to the flow. Lastly, the present invention performs graphical interface (GUI) for allowing the network manager to observe the change of entropy value of the flow head information easily so as to verify the unusual situation of the present network.

It is a challenge task to conduct entropy computation on the attributes of packet header in high-speed networks. Motivated by Ashwin Lall et al., we present a stream-based scheme to estimate to the entropy to the entropy norm based on count sketch algorithm. The system is implemented on a NetFPGA-10G platform. It is capable of processing IP packets and computing the entropy in 30 Gbps line rate.

Although specific embodiments have been illustrated and described, it will be obvious to those skilled in the art that various modifications may be made without departing from what is intended to be limited solely by the appended claims.

What is claimed is:

1. A method for estimating entropy configured in NetFPGA, comprising:
   setting an allowable error to deciding a sample number according to a total of packets in a stream data in a measuring module;
   randomly sampling a plurality of locations in the stream data in a sampling module;
   applying to a count sketch algorithm to each packet for performing the count and update in a calculation and update module;
   applying the counter sketch algorithm to the each packet for performing the query according to flow IDs of the plurality of locations in a query module; and
   recording each query result of the each packet onto an entropy table, obtaining an average of a counter used in each same row in the entropy table, selecting a median to be an estimation value from the averages and obtaining an estimation entropy value according to the estimation value in a storage module;
   wherein the Count Sketch algorithm is used to perform the packet count query of flow ID, and then the query value is recorded onto the entropy table in sequence as to increase access time of the storage module;
   wherein the size of the storage module is fixed.

2. The method for estimating entropy according to claim 1, wherein the g and z are selected according to an equation as follow:

$$z = \left\lceil \frac{32 \log_2 m}{\varepsilon^2} \right\rceil, \quad g = 2 \log_2 \frac{1}{\delta}.$$

3. The method for estimating entropy according to claim 1, wherein the entropy table is an array table.

4. The method for estimating entropy according to claim 1, wherein the step of obtaining an average of a counter used in each same row in the entropy table, further comprising:
   obtaining a calculation value by calculating the counter value used in the each same row in the entropy table according to a equation; and
   obtaining the average of the counter of each row according to the calculation value.

5. The method for estimating entropy according to claim 4, wherein the equation is represents as follows:
   $X = m(c \log(c) - (c-1)\log(c-1))$.

6. The method for estimating entropy according to claim 1, wherein the step of obtaining an estimation entropy value according to the estimation value, further comprises:
   substituting the estimation value into a equation to obtain a estimation entropy value, and wherein the equation being represented as follow, $$H = \log(m) - \frac{s}{m}.$$

7. A system for estimating entropy configured in NetFPGA, comprising:
   a measuring module, setting an allowable error to deciding a sample number according to a total of packets in a stream data;
   a sampling module, coupled to the measuring module, randomly sampling a plurality of locations in the stream data;
   a calculation and update module, coupled to the sampling module, applying to a count sketch algorithm to each packet for performing the count and update;

a query module, coupled to the calculation and update module, applying the counter sketch algorithm to the each packet for performing the query according to flow IDs of the plurality of locations; and a storage module, coupled to the query module and the calculation and update module, obtaining an average of a counter used in each same row in the entropy table, and selecting a median to be an estimation value from the averages, and obtaining an estimation entropy value according to the estimation value;

wherein the Count Sketch algorithm is used to perform the packet count query of flow ID, and then the query value is recorded onto the entropy table in sequence as to increase access time of the storage module;

wherein the size of the storage module is fixed.

8. The system for estimating entropy according to claim 7, wherein the plurality of locations is an array having g×z locations.

9. The system for estimating entropy according to claim 8, wherein the g and z are selected according to an equation as follow:

$$z = \left\lceil \frac{32 \log_2 m}{\varepsilon^2} \right\rceil, g = 2\log_2 \frac{1}{\delta}.$$

10. The system for estimating entropy according to claim 7, wherein the entropy table is an array table.

11. The system for estimating entropy according to claim 7, wherein the calculation and update module obtains a calculation value by calculating the counter value used in the each same row in the entropy table according to a equation, and obtains the average of the counter of each row according to the calculation value.

12. The system for estimating entropy according to claim 11, wherein the equation is represented as follow:

$$X = m(c \log(c) - (c-1)\log(c-1)).$$

13. The system for estimating entropy according to claim 7, wherein the calculation and update module substitutes the estimation value into a equation to obtain a estimation entropy value, and wherein the equation being represented as follow, $$H = \log(m) - \frac{s}{m}.$$

* * * * *